United States Patent
Losani

(10) Patent No.: US 8,950,085 B2
(45) Date of Patent: Feb. 10, 2015

(54) SHOE SOLE THAT ALLOWS BREATHABILITY OF THE FOOT

(75) Inventor: Ivano Losani, Monte San Giusto (IT)

(73) Assignee: Bibo S.p.A., San Giovanni Lupatoto (VR) (IT)

( * ) Notice: Subject to any disclaimer, the term of this patent is extended or adjusted under 35 U.S.C. 154(b) by 462 days.

(21) Appl. No.: 13/387,793

(22) PCT Filed: Sep. 14, 2010

(86) PCT No.: PCT/EP2010/005645
§ 371 (c)(1),
(2), (4) Date: Jan. 30, 2012

(87) PCT Pub. No.: WO2011/042112
PCT Pub. Date: Apr. 14, 2011

(65) Prior Publication Data
US 2012/0124861 A1 May 24, 2012

(30) Foreign Application Priority Data
Oct. 6, 2009 (IT) ................ AN2009A0073

(51) Int. Cl.
*A43B 7/08* (2006.01)
*A43B 7/00* (2006.01)
*A43B 7/12* (2006.01)
*B29D 35/12* (2010.01)

(52) U.S. Cl.
CPC . *A43B 7/12* (2013.01); *A43B 7/084* (2013.01); *A43B 7/08* (2013.01); *B29D 35/122* (2013.01)
USPC .......................... 36/3 B; 36/147; 36/28; 36/29

(58) Field of Classification Search
CPC . A43B 7/08–7/084; A43B 7/088; A43B 7/10; A43B 7/105; A43B 7/12; A43B 7/06
USPC ................ 36/3 B, 3 R, 3 A, 28, 29, 141, 147
See application file for complete search history.

(56) References Cited

U.S. PATENT DOCUMENTS

| | | | | |
|---|---|---|---|---|
| 2,090,881 A | * | 8/1937 | Wilson | 36/29 |
| 6,076,282 A | * | 6/2000 | Brue' | 36/3 B |
| 6,209,226 B1 | * | 4/2001 | Squadroni | 36/3 B |
| 6,266,898 B1 | * | 7/2001 | Cheng | 36/29 |
| 6,434,859 B1 | * | 8/2002 | Kim | 36/43 |
| 7,225,491 B2 | * | 6/2007 | Reed et al. | 12/142 P |
| 7,712,229 B2 | * | 5/2010 | Yang | 36/3 B |
| 7,850,628 B2 | * | 12/2010 | Beiruti | 601/134 |

FOREIGN PATENT DOCUMENTS

EP 0875163 A2 11/1998
EP 0910964 A2 4/1999

OTHER PUBLICATIONS

International Search Report for corresponding International Application No. PCT/EP2010/005645.

* cited by examiner

*Primary Examiner* — Jila M Mohandesi
(74) *Attorney, Agent, or Firm* — Egbert Law Offices, PLLC

(57) ABSTRACT

The present invention concerns the footwear sector and more specifically it concerns a sole obtainable through compression or injection moulding that allows breathability of the wearer's foot thanks to the combined action of a series of technical elements such as cylindrical stems with relative caps of underlying air chambers shaped like truncated cones and compression distribution devices all located underneath an alternating series of holes moulded on the sole.

6 Claims, 2 Drawing Sheets

SHOE SOLE THAT ALLOWS BREATHABILITY OF THE FOOT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns the footwear sector and more specifically it concerns a sole obtainable through compression or injection moulding that allows breathability of the wearer's foot thanks to the combined action of a series of technical elements such as cylindrical stems with relative caps of underlying air chambers shaped like truncated cones and compression distribution devices all located underneath an alternating series of holes moulded on the sole.

2. Description of Related Art Including Information Disclosed Under 37 CFR 1.97 and 37 CFR 1.98

One of the main goals of footwear manufacturers has always been to improve the comfort of their products for users both to facilitate walking and to eliminate the vapour generated inside the shoe due to the perspiration of the foot.

In this sense, in the current state of the art, soles exist that are equipped with an air cushion and with holes to increase comfort and the internal breathability of the shoes, and that have, in fact, been object of numerous patents dating back as far as 1884 with U.S. Pat. No. 302,190 "Air cushion or boot or shoe soles", which was followed by U.S. Pat. No. 1,044,941 of 19 Nov. 1912; U.S. Pat. No. 1,605,588 of 2 Nov. 1926; U.S. Pat. No. 2,030,545 of 11 Feb. 1936.

More recently, the problem of ventilation inside shoes has been dealt with by fitting, between the foot resting surface and the external sole, a midsole presenting a plurality of equidistant slits the purpose of which is to push the air inside the shoe downwards (U.S. Pat. No. 3,256,621 of 21 Jun. 1966). A similar solution was adopted also by U.S. Pat. No. 5,588,226 of 31 Dec. 1996 entitled "Unidirectional air transfer system for shoes", drilling in the footbed and in the sole a series of holes designed to facilitate the unidirectional transfer of air between the openings in the footbed and the sole.

Another solution to allow breathability inside shoes is described and claimed by U.S. Pat. No. 5,044,096 of 3 Sep. 1991 entitled "Sole structure or footwear" and consists of a tread sole having microholes formed therein which traverse its whole thickness and is covered by a membrane made of microporous, breathable and waterproof material, preferably Gore-Tex, so as to keep the foot dry and protected from any dampness created by the sweating of the foot or from any water that might have entered through the microholes created in the tread sole.

In any case, the results achieved by the solutions adopted and patented up till the 1990s proved not to be satisfactory as they were not able to guarantee increased ventilation of the foot, nor to prevent the infiltration of water through the microholes in the tread sole.

In particular, the solution described and claimed in U.S. Pat. No. 5,044,096 presents the problem of having to use an extremely thin type of breathable membrane, thereby creating the necessity to protect the said membrane from the abrasive action of the foot during walking with foam material or with polyester felt. This protective material, having a low resistance to compression, loses its thickness through use, tending to flatten irreversibly resulting in a marked loss of comfort in the shoes.

Other materials that are more resistant to compression, e.g. polyurethanes with a high resistance to compression, present the problem of increasing the temperature inside the shoe as they are insulating materials.

In order to overcome the aforementioned problems, other technical solutions were adopted, such as that described and claimed in U.S. Pat. No. 6,209,226 of 3 Apr. 2001 which provides for the adoption of air chambers extending through the whole thickness of the sole formed by elastic spacers and, in any case, such as to create, during walking, an exchange of air under the sole of the foot.

With European patent No. 0975243 the solution to allow breathability of the foot was approached by fitting a series of check valves for the purpose of expelling the air inside the shoe, during walking, through microholes connected with the outside, all equipped with concave values facing the perforated footbed and consisting of a membrane.

Moreover, the air expelling valves referred to in this patent are covered inside the sole by a series of cone-shaped elements positioned at a certain distance from one another and designed to press the air inside them so as to open the valves.

The problem of the aforementioned system is that the cone shape of the elements covering the valves is facing upwards with the effect of creating discomfort to the sole of the wearer's foot also in consideration of the fact that, due to its particular shape, very strong pressure of the foot is required in order to bring about the expulsion of the air.

A further problem of the system referred to in the aforementioned patent is that the air pressure function can only affect that part of the sole in which the wearer's weight is at its maximum.

Another solution is that adopted by U.S. patent application Ser. No. 10/874,213 of 24 Jun. 2004, Publication No. US 2005/0283996 of 29 Dec. 2005, which provided for the creation in the internal part of the sole of a cavity in which to fit a soft membrane consisting of small elastic lamellas preferably rectangular in shape facing towards the bottom of the sole so that the air cushion created in the interspace between the membrane and the concave base of the sole, due to the pressure exerted by the weight of the body on the resting foot and due to the increase in the angle of the lamellas, is expelled to the exterior through a channel realised in the internal structure of the sole equipped with a unidirectional outlet valve.

The problem with the membrane described and claimed in US Patent 2005/0283996 is that the lamellas with which it is equipped tend, with use, to lose their elasticity and break, so that their cushioning effect and the internal ventilation of the foot are limited in time.

Another problem with the above-described solution is that the unidirectional valve may cease to function correctly over time, impeding the discharge of damp air or allowing the infiltration of water in case of rain.

BRIEF SUMMARY OF THE INVENTION

It is an object of the present invention to resolve the above-described problems by proposing a sole which, thanks to a series of elements incorporated in its interior such as an alternating series of ventilation holes, compression distribution devices, cylindrical stems with caps for underlying air chambers with a special truncated-cone shape connected with a series of dome-shaped cavities, guarantees the prolonged duration of the foot breathability function, the said function not deriving from the specific characteristics of certain accessory elements (lamellas, membranes, suction cups or other devices claimed in the above-mentioned patents) which tend to deteriorate with use.

As a result, it is a further object of the present invention to permit better and more prolonged breathability inside the shoe ensuring that the wearer's foot will remain dry whatever the conditions.

These and other objects are achieved by the invention that is the object of the present application which concerns a sole obtainable through compression or injection moulding that allows breathability of the wearer's foot thanks to the combined action of a series of cylindrical stems with relative caps for air chambers shaped like truncated cones and a series of alternating holes and compression distribution devices that facilitate the expulsion of the air inside the shoe through the pressure of the foot during walking.

BRIEF DESCRIPTION OF THE DRAWINGS

Further characteristics and advantages of the invention will become more readily apparent from the description of a preferred, but not exclusive, embodiment of the present application, illustrated by way of non-limiting example in the accompanying drawings, in which:

FIG. 1 is a view from above of the sole (1) characterised by a series of flat holes (2) alternated with a series of smaller flat holes (10), and directly moulded inside these flat holes (2) there is a cylindrical stem (3) equipped with a cap (4) having a concave upper base, with air chambers having the shape of truncated cones (5) connected with the exterior of the outsole (1) by means of a ventilation channel (6) located at an external dome-shaped cavity (7) in the sole (1), as portrayed in FIG. 1/a.

FIG. 1/b is an enlargement showing a cross-section of the structure underlying the series of smaller holes (10) and it portrays the compression distribution device (11) moulded directly on the sole (1).

Figure 2:
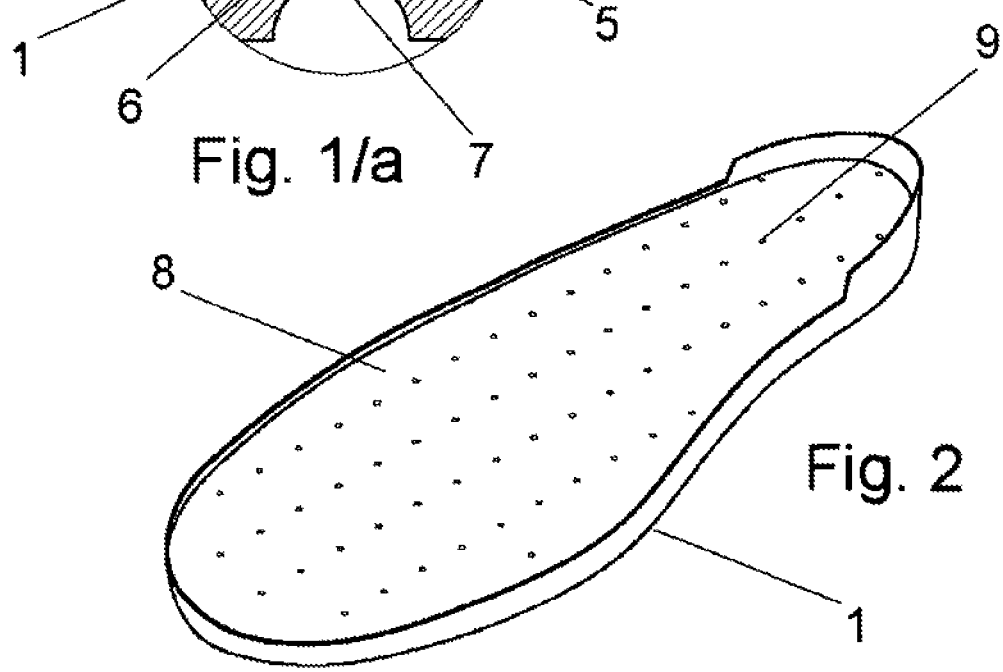

The said compression distribution device (11) is located at the sides of the cavity underlying the holes (2) and at a certain distance from the cap (4) so as to compensate the pressure of the foot and prevent the intermediate sole (8) portrayed in FIG. 2 from coming into contact with the truncated cone-shaped air chamber (5).

Figure 1:
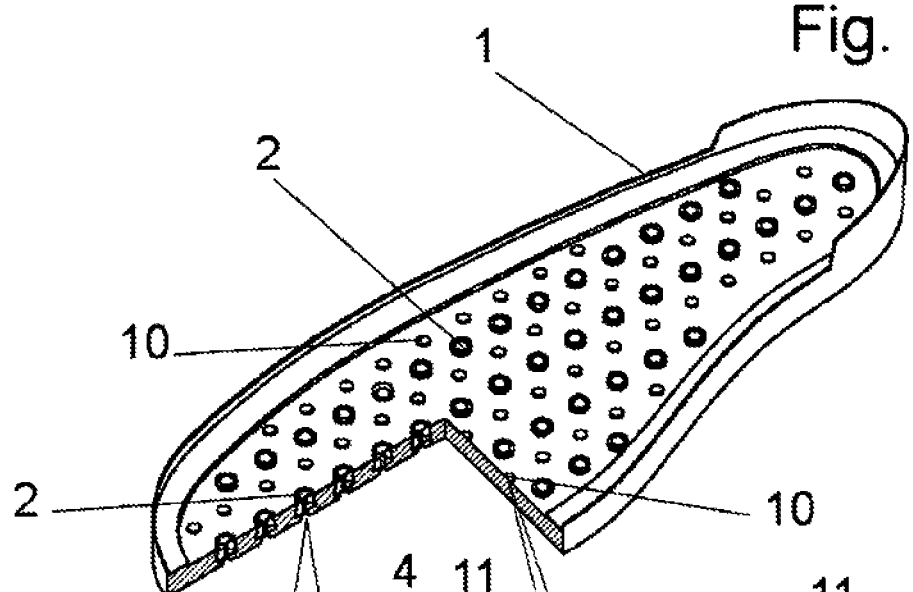
Figure 3:
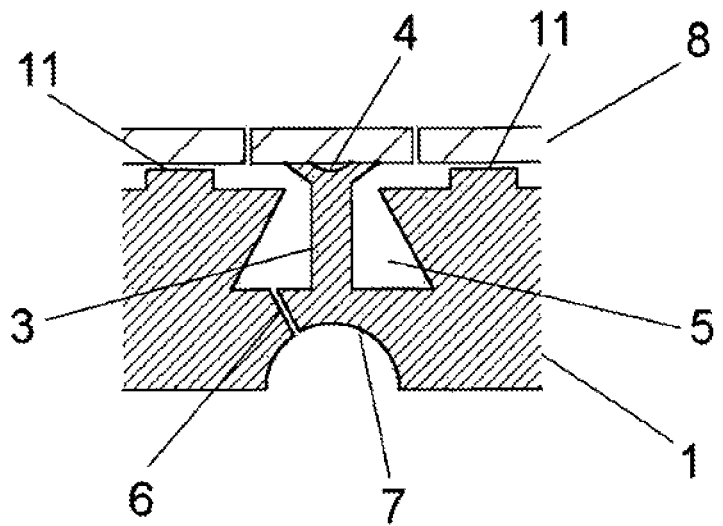

FIG. 3 shows a cross-section of the sole (1) with all the elements portrayed in FIG. 1/a in their normal static position and with the addition of the ordinary intermediate sole (8) with holes (9) in line with the various flat holes (10).

Figure 4:
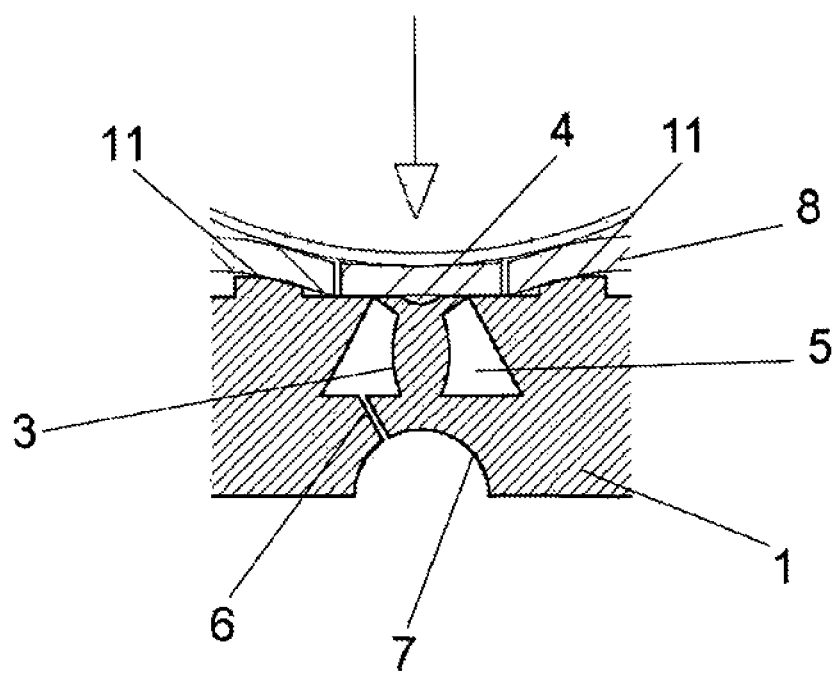

FIG. 4 shows a cross-section of the sole (1) portraying the series of elements described in FIG. 1/a and FIG. 3 in the dynamic position or with pressure from the foot in which it can be seen that the cap (4) of the cylindrical stem (3) fully enters with its entire rectangular length inside the truncated cone-shaped air chamber (5) thereby pushing the air into the ventilation channel (6) connected with the outside and located at the dome-shaped cavity (7).

DETAILED DESCRIPTION OF THE INVENTION

The invention that is object of the present application concerns a sole (1) characterised by a series of flat holes (2) alternated by a series of smaller flat holes (10), inside which the following elements are moulded respectively: a cylindrical stem (3) equipped with a cap (4) of a truncated cone-shaped air chamber (5) connected with the exterior of the outsole (1) at a dome-shaped cavity (7) with a ventilation hole (6) and, underneath the smaller flat holes (10), compression distribution devices (11) positioned at each side of the cap (4) and having the dual function of supporting an ordinary intermediate sole (8) with holes (9) over the smaller holes (10) so that the damp air created by the perspiration of the wearer's foot is pushed into the truncated cone-shaped air chamber (5), and so as to avoid the direct contact of the intermediate sole (8) with the truncated cone-shaped air chamber (5) moulded under the hole (2).

In the static position, the height of the cylindrical stem (3) with its cap (4) remains in line with the surface of the sole (1) and at the same height of the compression distribution devices (11), while, during walking, i.e. in the dynamic phase, the pressure of the foot presses the cylindrical stem (3) downwards so that its cap (4) closes the truncated cone-shaped air chamber (5) generating a thrust of air towards the outside through the ventilation channel (6) connected with the exterior of the outsole at the dome-shaped cavity (7).

The system of the truncated cone-shaped air chamber (5) closed by the cap (4) of the cylindrical stem (3) during the dynamic phase of walking and that of the dome-shaped cavity (7) of the sole (1) combined with the air pressure forced into the ventilation hole (6) prevent the infiltration of water to the inside of the sole and, in any case, even if a small quantity of water were to be aspirated during the decompression phase, it would be collected in the truncated cone-shaped air chamber (5) alone and held there by the cap (4) of the cylindrical stem (3) thereby preventing its coming into contact with the intermediate sole (8).

The materials and the dimensions of the above-described invention, illustrated in the accompanying drawings and later claimed, may be varied according to requirements. Moreover, all the details may be replaced by other technically equivalent ones without for this reason straying from the protective scope of the present invention patent application.

I claim:

1. An article comprising:
a shoe sole having a first plurality of holes and a second plurality of holes arranged in alternating relation with said first plurality of holes, each of said first plurality of holes having an opening at an upper surface of said shoe sole, each of said second plurality of holes having an opening at said upper surface of said shoe sole, said shoe sole having a cylindrical stem positioned in each of said first plurality of holes, said cylindrical stem having a cap at an upper end thereof, said cap positioned adjacent the opening of said first plurality of holes, each of said first plurality of holes defining a chamber of a truncated cone shape, said shoe sole having a plurality of dome-shaped cavities at a lower surface thereof, said chamber communicating with the dome-shaped cavity through a ventilation channel formed within said shoe sole, each of said second plurality of holes having a compression distribution protrusion formed thereon, said compression distribution protrusion having an upper surface adjacent the opening of the second plurality of holes, said cap being movable downwardly so as to close the opening of said first plurality of holes such that air in said chamber is discharged outwardly of said shoe sole through the dome-shaped cavity.

2. The article of claim 1, further comprising:

an intermediate sole having a series of holes formed therethrough, the compression distribution protrusion supporting said intermediate sole above said first plurality of holes of said shoe sole.

3. The article of claim 1, the opening of said first plurality of holes each having a diameter greater than a diameter of each of said second plurality of holes.

4. The article of claim 1, said cap having a diameter approximately equal to a diameter of said first plurality of holes.

5. The article of claim 1, said cap having an upper surface coplanar with said upper surface of said shoe sole.

6. The article of claim 1, said dome-shaped cavity having a wide diameter opening at said lower surface of said shoe sole and a narrow diameter adjacent and below said air chamber.

\* \* \* \* \*